US011017095B2

(12) United States Patent
Ye et al.

(10) Patent No.: US 11,017,095 B2
(45) Date of Patent: May 25, 2021

(54) METHOD AND APPARATUS FOR TRUSTED MEASUREMENT OF CLOUD COMPUTING PLATFORM

(71) Applicant: HUAWEI TECHNOLOGIES CO., LTD., Shenzhen (CN)

(72) Inventors: Sihai Ye, Shenzhen (CN); Xun Shi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 361 days.

(21) Appl. No.: 16/111,230

(22) Filed: Aug. 24, 2018

(65) Prior Publication Data
US 2018/0365430 A1    Dec. 20, 2018

Related U.S. Application Data

(63) Continuation of application No. PCT/CN2016/097668, filed on Aug. 31, 2016.

(30) Foreign Application Priority Data

Feb. 26, 2016   (CN) .......................... 201610109021.6

(51) Int. Cl.
*G06F 21/57*   (2013.01)
*H04L 29/06*   (2006.01)
(Continued)

(52) U.S. Cl.
CPC ............ *G06F 21/577* (2013.01); *G06F 21/12* (2013.01); *G06F 21/57* (2013.01); *G09F 19/18* (2013.01);
(Continued)

(58) Field of Classification Search
CPC ........ G06F 21/577; G06F 21/12; G06F 21/57; G06F 19/18; G06F 2221/033;
(Continued)

(56) References Cited

U.S. PATENT DOCUMENTS 9,294,282 B1 *   3/2016   Potlapally ............. H04L 9/3242
2010/0083349 A1   4/2010   Xiao et al.
(Continued)

FOREIGN PATENT DOCUMENTS

CN      101043338 A     9/2007
CN      101242297 A     8/2008
(Continued)

OTHER PUBLICATIONS

Liang Lulu et al, Third-party based cloud platform trusted evaluation framework. Proceedings of the 7th Information Security Vulnerability Analysis and Risk Assessment Conference, Apr. 23, 2015, 3 pages.

*Primary Examiner* — Hee K Song
(74) *Attorney, Agent, or Firm* — Kilpatrick Townsend & Stockton LLP

(57) ABSTRACT

A method for trusted measurement of a cloud computing platform includes: generating, by a third-party management and audit system, an audit report based on a current running indicator, signed by using a digital certificate, of a software and a running security indicator of the software, where the audit report indicates trustworthiness of a cloud computing platform. In this way, a process of trusted measurement of the cloud computing platform is open and transparent, so that authenticity of trusted measurement of the cloud computing platform is improved, thereby increasing a user's trust in the cloud computing platform.

32 Claims, 5 Drawing Sheets

(51) Int. Cl.
    *G09F 19/18* (2006.01)
    *G06F 21/12* (2013.01)
    *H04L 9/32* (2006.01)
(52) U.S. Cl.
    CPC ............ *H04L 9/321* (2013.01); *H04L 9/3247* (2013.01); *H04L 9/3263* (2013.01); *H04L 63/0823* (2013.01); *H04L 63/20* (2013.01); *G06F 2221/033* (2013.01); *G06F 2221/0775* (2013.01); *G06F 2221/2101* (2013.01)
(58) Field of Classification Search
    CPC ..... G06F 2221/0775; G06F 2221/2101; H04L 9/3221; H04L 9/3247; H04L 9/3263; H04L 63/0823; H04L 63/20
    See application file for complete search history.

(56) References Cited

U.S. PATENT DOCUMENTS

| | | | |
|---|---|---|---|
| 2011/0219434 A1* | 9/2011 | Betz | H04L 63/20 726/5 |
| 2012/0179904 A1 | 7/2012 | Dunn et al. | |
| 2012/0216244 A1* | 8/2012 | Kumar | G06F 21/57 726/1 |
| 2012/0265976 A1* | 10/2012 | Spiers | G06F 9/45533 713/2 |
| 2012/0266252 A1 | 10/2012 | Spiers et al. | |
| 2013/0097601 A1* | 4/2013 | Podvratnik | G06F 8/61 718/1 |
| 2013/0191643 A1* | 7/2013 | Song | H04L 9/3247 713/176 |
| 2015/0127795 A1* | 5/2015 | Jagana | G06F 9/45558 709/223 |
| 2015/0134965 A1* | 5/2015 | Morenius | G06F 21/57 713/172 |
| 2015/0256341 A1 | 9/2015 | Ye et al. | |
| 2015/0347264 A1* | 12/2015 | Mohammed | H04L 67/10 714/45 |
| 2017/0078314 A1* | 3/2017 | Mohanty | H04L 63/145 |
| 2017/0161505 A1* | 6/2017 | Campagna | G06F 9/45558 |
| 2018/0365045 A1* | 12/2018 | Hakala | G06F 21/575 |
| 2018/0365430 A1* | 12/2018 | Ye | H04L 9/3263 |

FOREIGN PATENT DOCUMENTS

| | | |
|---|---|---|
| CN | 101477602 A | 7/2009 |
| CN | 101800642 A | 8/2010 |
| CN | 103843303 A | 6/2014 |
| WO | 2011146305 A2 | 11/2011 |
| WO | 2014039497 A1 | 3/2014 |

* cited by examiner

METHOD AND APPARATUS FOR TRUSTED MEASUREMENT OF CLOUD COMPUTING PLATFORM

CROSS-REFERENCE TO RELATED APPLICATIONS

This application is a continuation of International Application No. PCT/CN2016/097668, filed on Aug. 31, 2016, which claims priority to Chinese Patent Application No. 201610109021.6, filed on Feb. 26, 2016. The disclosures of the aforementioned applications are hereby incorporated by reference in their entireties.

TECHNICAL FIELD

The present invention relates to the computer field, and in particular, to a method and an apparatus for trusted measurement of a cloud computing platform.

BACKGROUND

A cloud computing platform can allow a user to access, by using a ubiquitous, convenient, and on-demand network, a shared computing resource pool that can be dynamically configured. The shared computing resource pool includes network devices, servers, storage devices, applications, and services. The cloud computing platform can implement rapid provisioning and release of the foregoing configurable computing resources at relatively low management costs or with relatively low complexity of interaction between a user and a service provider.

After a user migrates data to the cloud computing platform, proprietary and control rights of the data are separated. The user is an owner of the data, and the control right of the data is transferred to a provider of the cloud computing platform. All resource-related operations such as data-related computing and storage are completed by the user by using the cloud computing platform. In this way, to really implement large-scale development and application of the cloud computing platform, a security problem of the cloud computing platform needs to be first resolved.

FIG. 1 is a schematic diagram of an architecture in which trusted measurement is performed on a cloud computing platform in the prior art. In the architecture shown in FIG. 1, based on direct trust in a verification server and trust of the verification server in the cloud computing platform, a user can establish indirect trust in the cloud computing platform. In a process for establishing the trust between the verification server and the cloud computing platform, the verification server can technically trust the cloud computing platform by using hardware capabilities of a trusted platform module (TPM) security chip and a central processing unit (CPU)/basic input output system (BIOS) that are disposed on a cloud computing node, and specifications of the trusted computing group (TCG). In other words, the cloud computing platform can technically ensure that a current running indicator of software sent to the verification server is true.

However, in the architecture shown in FIG. 1, both the verification server and the cloud computing platform are managed and controlled by a provider of the cloud computing platform, and a process of trusted measurement of the cloud computing platform may be implemented by an internal remote certification and audit system. However, the internal remote certification and audit process is non-transparent to the user and is not supervised by a trusted third-party authority. As a result, various unknown risks exist in the foregoing process, and trustworthiness of the cloud computing platform is reduced. For example, in the foregoing process, a digital certificate of a trusted platform and a digital certificate of the cloud computing platform may be internal digital certificates issued by the provider. When the provider needs to verify an internal digital certificate, the internal digital certificate is converted into a digital certificate in accordance with a certification authority (CA) standard for verification. The provider may replace the internal digital certificate, and consequently, authenticity of the digital signature corresponding to the internal digital certificate cannot be ensured. In addition, authenticity of measurement information signed by using the digital signature cannot be ensured either, and the measurement information may be tampered with.

SUMMARY

This application provides an improved solution for trusted measurement of a cloud computing platform, so as to improve process transparency of trusted measurement of a cloud computing platform and increase a user's trust in the cloud computing platform.

According to a first aspect, this application provides a method for trusted measurement of a cloud computing platform. The method includes: receiving, by a third-party management and audit system, a current running indicator of software on a cloud computing platform, where the current running indicator of the software is signed by a trusted platform of the cloud computing platform by using a digital certificate issued by a certification authority (CA); obtaining, by the third-party management and audit system, a running security indicator of the software from a third-party assessment organization; and generating, by the third-party management and audit system, an audit report based on the current running indicator, signed by using the digital certificate, of the software and the running security indicator of the software, where the audit report indicates trustworthiness of the cloud computing platform.

The trusted third-party management and audit system performs trusted measurement on the cloud computing platform, and compares the running security indicator, obtained through assessment by the security organization, of the software with the original current running indicator that is of the software and that is obtained after trusted measurement is performed on the cloud computing platform, so as to obtain the audit report. In this way, a process of trusted measurement of the cloud computing platform is open and transparent. This avoids a prior-art risk that a current running indicator of software may be tampered with due to certificate replacement in a process for performing trusted measurement on a cloud computing platform by using an internal management and audit system, so that authenticity of trusted measurement of the cloud computing platform is improved, thereby increasing a user's trust in the cloud computing platform.

With reference to the first aspect, in a possible implementation of the first aspect, the current running indicator of the software is signed by the cloud computing platform by using the digital certificate issued by the CA.

With reference to the first aspect or the foregoing possible implementation of the first aspect, in another possible implementation of the first aspect, the current running indicator of the software carries an identifier of a virtual machine of the cloud computing platform, and the method further includes: receiving, by the third-party management and audit system, a correspondence between a user identifier and a virtual machine identifier; determining, by the third-party management and audit system based on the identifier of the virtual machine and the correspondence, a user corresponding to the identifier of the virtual machine; and sending, by the third-party management and audit system, the audit report to the user corresponding to the identifier of the virtual machine.

The identifier of the virtual machine of the cloud computing platform is carried in the current running indicator of the software. In this way, the third-party management and audit system can associate, based on the identifier of the virtual machine, the audit report with the user using the virtual machine, so that each user can obtain an audit report related to the user.

With reference to the first aspect or any one of the foregoing possible implementations of the first aspect, in another possible implementation of the first aspect, the method further includes: receiving, by the third-party management and audit system, information about a running version of the software, and obtaining, by the third-party management and audit system, information about an assessment version of the software from the third-party assessment organization; and the generating, by the third-party management and audit system, an audit report based on the current running indicator of the software and the running security indicator of the software includes: generating, by the third-party management and audit system, the audit report based on the current running indicator of the software, the running security indicator of the software, the information about the running version of the software, and the information about the assessment version of the software.

The third-party management and audit system obtains the information about the assessment version of the software from the third-party security assessment organization, and stores, in the audit report, the information about the running version of the software on the cloud computing platform and the information about the assessment version of the software, where the audit report may be obtained by the user. This can avoid a prior-art problem that a running version and an assessment version provided by a provider of a cloud computing platform for software on the cloud computing platform are inconsistent.

With reference to the first aspect or any one of the foregoing possible implementations of the first aspect, in another possible implementation of the first aspect, the method further includes: receiving, by the third-party management and audit system, a running log of the cloud computing platform sent by the cloud computing platform; and the generating, by the third-party management and audit system, an audit report based on the current running indicator of the software and the running security indicator of the software further includes: generating, by the third-party management and audit system, the audit report based on the current running indicator of the software, the running security indicator of the software, and the running log.

The third-party management and audit system stores the running log of the cloud computing platform in the audit report for user audit. In this way, a running parameter of the cloud computing platform is transparent, thereby increasing a user's trust in the cloud computing platform.

With reference to the first aspect or any one of the foregoing possible implementations of the first aspect, in another possible implementation of the first aspect, the method further includes: receiving, by the third-party management and audit system, an operation log of the cloud computing platform sent by the cloud computing platform; and the generating, by the third-party management and audit system, an audit report based on the current indicator of the software and the running security indicator of the software further includes: generating, by the third-party management and audit system, the audit report based on the current running indicator of the software, the running security indicator of the software, and the operation log.

The third-party management and audit system stores the operation log of the cloud computing platform in the audit report for user audit. In this way, a related operation performed by an administrator on the cloud computing platform is transparent, thereby increasing a user's trust in the cloud computing platform.

With reference to the first aspect or any one of the foregoing possible implementations of the first aspect, in another possible implementation of the first aspect, before the receiving, by a third-party management and audit system, a current running indicator of software on a cloud computing platform, the method further includes: receiving, by the third-party management and audit system, a registration request sent by the cloud computing platform, where the registration request includes a digital certificate of the cloud computing platform; and sending, by the third-party management and audit system, acknowledgement information to the cloud computing platform, where the acknowledgement information indicates that the cloud computing platform is successfully registered with the third-party management and audit system.

With reference to the first aspect or any one of the foregoing possible implementations of the first aspect, in another possible implementation of the first aspect, before the receiving, by a third-party management and audit system, a current running indicator of software on a cloud computing platform, the method further includes: receiving, by the third-party management and audit system, a registration request sent by the cloud computing platform, where the registration request includes a digital certificate of the trusted platform; and sending, by the third-party management and audit system, acknowledgement information to the cloud computing platform, where the acknowledgement information indicates that the trusted platform is successfully registered with the third-party management and audit system.

With reference to the first aspect or any one of the foregoing possible implementations of the first aspect, in another possible implementation of the first aspect, the method further includes: sending, by the third-party management and audit system, the digital certificate to the CA, and receiving, by the third-party management and audit system, verification information, sent by the CA, of the digital certificate, where the verification information indicates whether the digital certificate is valid; and the generating, by the third-party management and audit system, an audit report based on the current running indicator of the software and the running security indicator of the software includes: generating, by the third-party management and audit system, the audit report of a cloud platform system based on the current running indicator of the software, the running security indicator of the software, and the verification information of the digital certificate.

With reference to the first aspect or any one of the foregoing possible implementations of the first aspect, in another possible implementation of the first aspect, the third-party management and audit system is a system located outside the cloud computing platform, the third-party management and audit system is provided by a trusted third party, the third-party management and audit system is connected to the cloud computing platform, and the third-party management and audit system is connected to the third-party assessment organization.

The third-party management and audit system is located on a system outside the cloud computing platform and is provided by the trusted third party. In this way, a process of trusted measurement of the cloud computing platform is more transparent, thereby increasing a user's trust in the cloud computing platform.

According to a second aspect, this application provides a method for trusted measurement of a cloud computing platform. The method includes: receiving, by a trusted evidence processing system, a current running indicator of software on a cloud computing platform, where the current running indicator of the software is signed by a trusted platform of the cloud computing platform by using a digital certificate issued by a certification authority (CA); and sending, by the trusted evidence processing system, the current running indicator of the software to a third-party management and audit system, so that the third-party management and audit system generates an audit report based on the current running indicator of the software and a running security indicator of the software, where the audit report indicates trustworthiness of the cloud computing platform.

The trusted third-party management and audit system performs trusted measurement on the cloud computing platform, and compares the running security indicator, obtained through assessment by a security organization, of the software with the original current running indicator that is of the software and that is obtained after trusted measurement is performed on the cloud computing platform, so as to obtain the audit report. In this way, a process of trusted measurement of the cloud computing platform is open and transparent. This avoids a prior-art risk that a current running indicator of software may be tampered with due to certificate replacement in a process for performing trusted measurement on a cloud computing platform by using an internal management and audit system, so that authenticity of trusted measurement of the cloud computing platform is improved, thereby increasing a user's trust in the cloud computing platform.

With reference to the second aspect, in a possible implementation of the second aspect, before the sending, by the trusted evidence processing system, the current running indicator of the software to a third-party management and audit system, the method further includes: signing, by the trusted evidence processing system, the measurement information by using a digital certificate of the cloud computing platform, where the digital certificate of the cloud computing platform is the digital certificate issued by the CA.

With reference to the second aspect or the foregoing possible implementation of the second aspect, in another possible implementation of the second aspect, the method further includes: sending, by the trusted evidence processing system, a correspondence between a user and a virtual machine to the third-party management and audit system, so that the third-party management and audit system determines a user based on obtained virtual machine identifier information and sends the audit report to the user.

The correspondence between a user and a virtual machine is sent to the third-party management and audit system. In this way, the third-party management and audit system can associate, based on an identifier of a virtual machine, the audit report with a user using the virtual machine, so that each user can obtain an audit report related to the user.

With reference to the second aspect or any one of the foregoing possible implementations of the second aspect, in another possible implementation of the second aspect, the method further includes: receiving, by the trusted evidence processing system, information about a running version of the software on the cloud computing platform; and sending, by the trusted evidence processing system, the information about the running version of the software to the third-party management and audit system.

The trusted evidence processing system sends the running version of the software to the third-party management and audit system, so that an assessment version of the software and the running version of the software on the cloud computing platform can be stored in the audit report for user audit. This can avoid a prior-art problem that a running version and an assessment version provided by a provider of a cloud computing platform for software on the cloud computing platform are inconsistent.

With reference to the second aspect or any one of the foregoing possible implementations of the second aspect, in another possible implementation of the second aspect, the method further includes: sending, by the feasible evidence processing system, a digital certificate of the trusted platform and the digital certificate of the cloud computing platform to the CA; receiving, by the feasible evidence processing system, verification information sent by the CA, where the verification information indicates whether the digital certificate of the trusted platform and the digital certificate of the cloud computing platform are valid; and sending, by the feasible evidence processing system, the verification information to the third-party management and audit system.

With reference to the second aspect or any one of the foregoing possible implementations of the second aspect, in another possible implementation of the second aspect, before the receiving, by a trusted evidence processing system, a current running indicator of software on a cloud computing platform, the method further includes: receiving, by the feasible evidence processing system, a registration request sent by the cloud computing platform, where the registration request includes the digital certificate of the trusted platform of the cloud computing platform; and sending, by the feasible evidence processing system, acknowledgement information to the third-party management and audit system, where the acknowledgement information indicates that the trusted platform is successfully registered with the feasible evidence processing system.

With reference to the second aspect or any one of the foregoing possible implementations of the second aspect, in another possible implementation of the second aspect, the third-party management and audit system is a system located outside the cloud computing platform, the third-party management and audit system is provided by a trusted third party, the third-party management and audit system is connected to the cloud computing platform, and the third-party management and audit system is connected to a third-party security assessment organization.

The third-party management and audit system is the system located outside the cloud computing platform and is provided by the trusted third party. In this way, a process of trusted measurement of the cloud computing platform is more transparent, thereby increasing a user's trust in the cloud computing platform.

According to a third aspect, this application provides an apparatus for trusted measurement of a cloud computing platform. The apparatus includes modules configured to execute the method in the first aspect.

According to a fourth aspect, this application provides an apparatus for trusted measurement of a cloud computing platform. The apparatus includes modules configured to execute the method in the second aspect.

According to a fifth aspect, this application provides a computer-readable storage medium. The computer-readable storage medium is configured to store program code used for trusted measurement of a cloud computing platform. The program code is used to execute a method instruction in the first aspect.

According to a sixth aspect, this application provides a computer-readable storage medium. The computer-readable storage medium is configured to store program code used for trusted measurement of a cloud computing platform. The program code is used to execute a method instruction in the second aspect.

In some implementations, the current running indicator of the software may be an integrity measurement value of the software, and the running security indicator of the software may be an integrity reference value.

In some implementations, the current running indicator of the software may include measurement information about trusted start of the software and measurement information about trusted running of the software.

In some implementations, the trusted evidence processing system may be a processing module of the cloud computing platform.

In embodiments of the present invention, the third-party management and audit system audits information about trusted measurement of the cloud computing platform, and the audit report may be audited by the user. In this way, a process of trusted measurement of the cloud computing platform is open and transparent, so that authenticity of trusted measurement of the cloud computing platform is improved, thereby increasing a user's trust in the cloud computing platform.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
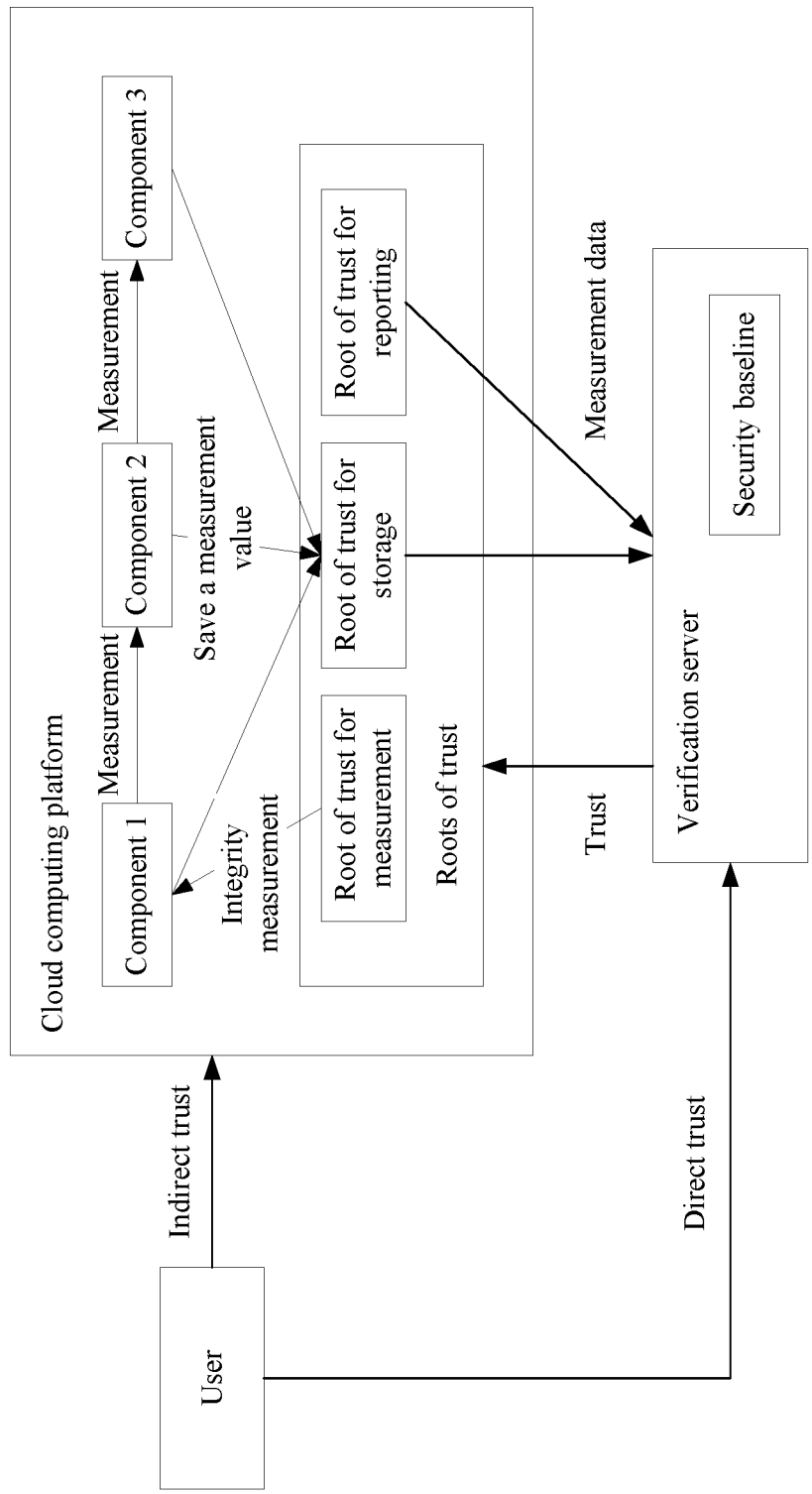
FIG. 1 is a schematic diagram of an architecture in which trusted measurement is performed on a cloud computing platform in the prior art.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The TCG defines "trusted" as follows: "When an entity implements a given target, if behavior of the entity is always as expected, the entity is trusted." Based on the definition, trusted computing is distinguished from a current security technology. "Trusted" emphasizes that a result of behavior is expectable, but does not mean that the behavior is confirmed as secure. These are two different concepts. For example, a user knows that a computer of the user is infected with a virus, knows a time at which the virus initiates an attack, and understands a consequence caused by the virus attack. If the virus really runs in this way, the computer is trusted. Based on the definition provided by the TCG, "trusted" actually further includes reliability in fault-tolerant computing. Reliability ensures that performance of a hardware or software system is predictable.

In the prior art, to increase a user's trust in a cloud computing platform, a technology of trusted computing is introduced in a process for establishing trust between a verification server and the cloud computing platform. An important application of the technology of trusted computing is to protect software integrity. A TPM security chip is a key component for trusted computing. The TPM security chip uses a password technology as a core, has computing and storage functions, and supports data protection, identity authentication, integrity measurement, and the like. The TPM security chip can perform integrity measurement on software and provide a measurement report. In terms of physical security, the TPM security chip is capable of preventing an attack, tampering, and detection, and can prevent the TPM and internal data from being illegally attacked. In terms of technology security, the TPM uses a plurality of password and access control technologies. In terms of management security, the TPM belongs to a commercial password product in China. Development, production, sale, and use of the TPM are effectively managed based on the national commercial password product. These protection measures jointly ensure security of the TPM, so that the TPM can become roots of trust of hardware storage of the cloud computing platform and a trusted basis point of the cloud computing platform.

A cloud computing platform node may use, as roots of trust, a TPM security chip deployed in a BIOS or CPU. In accordance with a principle of "first measurement and then execution", measurement, authentication, and trust are implemented level by level, to establish a chain of trust from the TPM security chip, to an operating system of the cloud computing platform, and then to running software, thereby implementing trusted measurement of the cloud computing platform.

Figure 2:
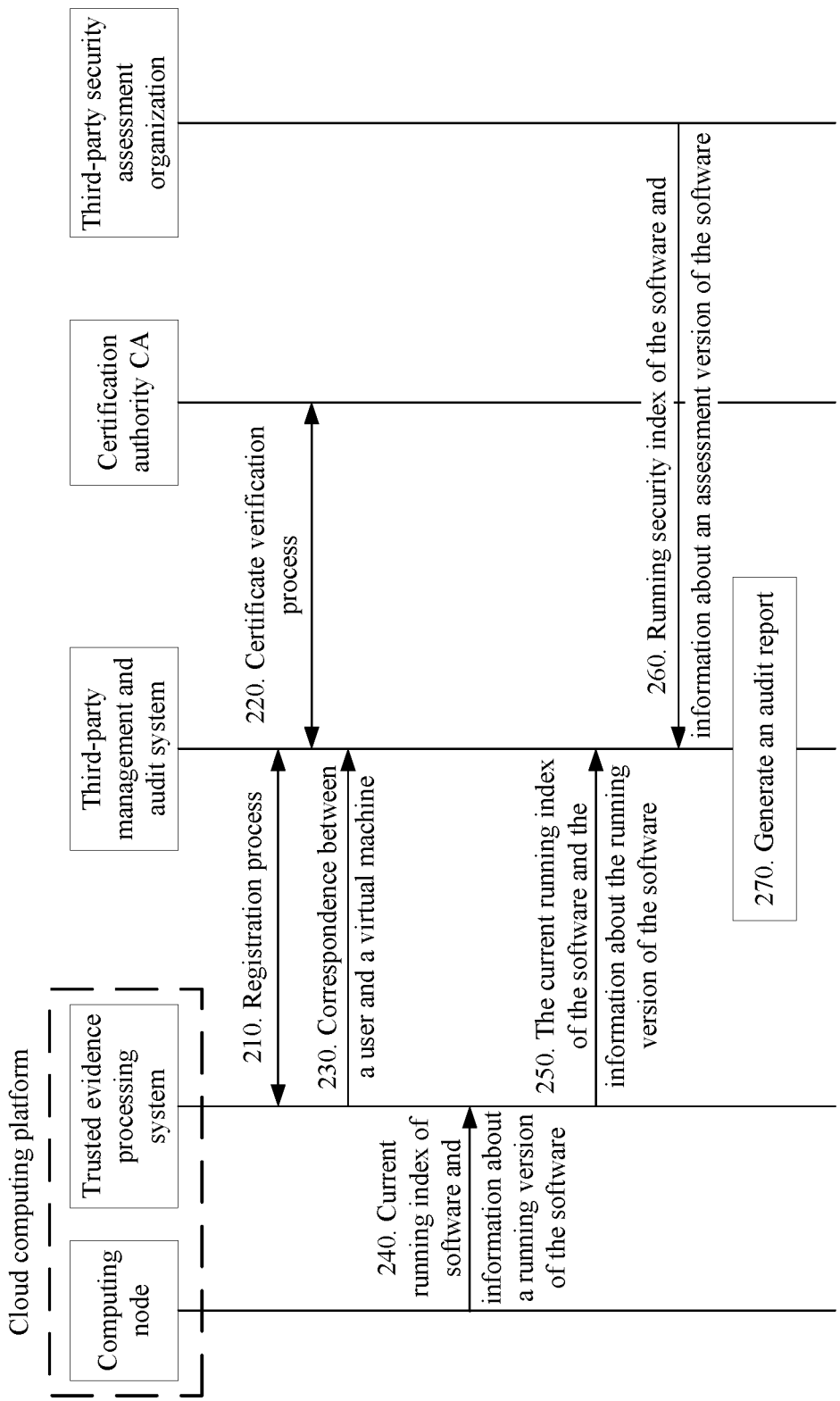
FIG. 2 is a schematic flowchart of a method for trusted measurement of a cloud computing platform according to an embodiment of the present invention.

To avoid a prior-art risk that measurement information may be tampered with because a provider may replace an internal digital certificate, after trusted measurement is performed on the cloud computing platform, a report on trusted measurement may be sent to a third-party management and audit system. The third-party management and audit system generates an audit report, increasing a user's trust in the cloud computing platform. With reference to FIG. 2, the following describes in detail a method for trusted measurement of a cloud computing platform according to an embodiment of the present invention.

FIG. 2 is a schematic flowchart of a method for trusted measurement of a cloud computing platform according to an embodiment of the present invention. It should be understood that FIG. 2 shows detailed steps or operations of the method for trusted measurement of a cloud computing platform, but these steps or operations are merely examples. In this embodiment of the present invention, another operation or a variant of each operation in FIG. 2 may be further performed. In addition, each step in FIG. 2 may be performed according to a sequence different from that presented in FIG. 2, and it may be unnecessary to perform all operations in FIG. 2. The following specifically describes the method steps shown in FIG. 2.

210. A third-party management and audit system receives a registration request sent by a cloud computing platform, and completes a registration process from a trusted evidence processing system to the third-party management and audit system.

Specifically, the registration request includes a digital certificate of the cloud platform and a digital certificate of a trusted platform. The third-party management and audit system may receive two registration requests sent by the trusted evidence processing system of the cloud computing platform, where the two registration requests include the digital certificate of the cloud computing platform and the digital certificate of the trusted platform, respectively. Alternatively, the third-party management and audit system may receive one registration request sent by the trusted evidence processing system of the cloud computing platform, where the registration request includes both the digital certificate of the cloud computing platform and the digital certificate of the trusted platform.

220. The third-party management and audit system sends a digital certificate of the cloud computing platform and a digital certificate of a trusted platform to a CA.

Specifically, the third-party management and audit system sends the digital certificate of the cloud computing platform and the digital certificate of the trusted platform to the CA, to verify validity of the digital certificates.

230. The trusted evidence processing system sends a correspondence between a user identifier and a virtual machine identifier to the third-party management and audit system.

240. A computing node sends a current running indicator of software on the cloud computing platform and information about a running version of the software to the trusted evidence processing system.

Specifically, the current running indicator of the software is signed by using the digital certificate of the trusted platform, and the digital certificate used by the trusted platform to sign measurement information of the software is a digital certificate issued by the CA.

In some embodiments, the computing node may further send a running log of the cloud computing platform and an operation log of the cloud computing platform to the trusted evidence processing system.

It should be understood that the current running indicator of the software may include start measurement data of the software and running measurement data of the software. Because the current running indicator of the software includes different types of measurement data, time cycles of sending, by the computing node, measurement information to the trusted evidence processing system may also be different. For example, the start measurement data of the software may be directly sent to the trusted evidence processing system after the software is started, where a quantity of sending times may be 1; and the running measurement data of the software may be sent to the trusted evidence processing system based on a preset cycle after a running status of the software is measured. The running log of the cloud computing platform and the operation log of the cloud computing platform may also be sent to the trusted evidence processing system in a manner the same as that used for the running measurement data of the software.

It should be further understood that, to make the third-party management and audit system operate in a performance-first operating mode, the feasible evidence processing system may further store the current running indicator of the software sent by the computing node, and then send the current running indicator of the software to the third-party management and audit system at the same time.

250. The third-party management and audit system receives the current running indicator of the software, measurement information of the software, and carried virtual machine identifier information sent by the trusted evidence processing system.

In some embodiments, in an embodiment, the current running indicator of the software may be further signed by using the digital certificate of the cloud platform.

260. The third-party management and audit system receives a running security indicator of the software and information about an assessment version of the software that are sent by a third-party assessment organization.

In some embodiments, in an embodiment, the assessment information of the software may include a digital fingerprint of the software.

270. The third-party management and audit system generates an audit report based on the current running indicator of the software, the running security indicator of the software, the information about the running version of the software, and the information about the assessment version of the software.

It should be understood that the audit report may be sent by the third-party management and audit system to a user corresponding to a virtual machine identifier, or may be sent by the third-party management and audit system to an audit report bulletin board for a user to view. This is not specifically limited in the present invention.

With reference to FIG. 1 and FIG. 2, the foregoing describes in detail the method for trusted measurement of a cloud computing platform in the embodiments of the present invention. With reference FIG. 3 to FIG. 6, the following describes in detail an apparatus for trusted measurement of a cloud computing platform according to the embodiments of the present invention. It should be understood that the apparatuses shown in FIG. 3 to FIG. 6 can implement each step in FIG. 2. To avoid repetition, details are not described herein again.

Figure 3:
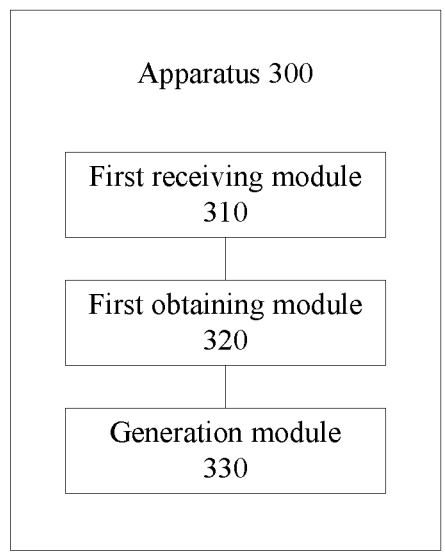
FIG. 3 is a schematic block diagram of an apparatus for trusted measurement of a cloud computing platform according to an embodiment of the present invention.

FIG. 3 is a schematic block diagram of an apparatus for trusted measurement of a cloud computing platform according to an embodiment of the present invention. The apparatus 300 shown in FIG. 3 includes a first receiving module 310, a first obtaining module 320, and a generation module 330.

The first receiving module 310 is configured to receive a current running indicator of software on a cloud computing platform, where the measurement information is signed by a trusted platform of the cloud computing platform by using a digital certificate issued by a certification authority (CA).

The first obtaining module 320 is configured to obtain a running security indicator of the software from a third-party assessment organization.

The generation module 330 is configured to generate an audit report based on the current running indicator of the software received by the receiving module and the running security indicator of the software obtained by the obtaining module, where the audit report indicates trustworthiness of the cloud computing platform.

A trusted third-party management and audit system performs trusted measurement on the cloud computing platform, and compares the running security indicator, obtained through assessment by the security organization, of the software with the original current running indicator that is of the software and that is obtained after trusted measurement is performed on the cloud computing platform, so as to obtain the audit report. In this way, a process of trusted measurement of the cloud computing platform is open and transparent. This avoids a prior-art risk that a current running indicator of software may be tampered with due to certificate replacement in a process for performing trusted measurement on a cloud computing platform by using an internal management and audit system, so that authenticity of trusted measurement of the cloud computing platform is improved, thereby increasing a user's trust in the cloud computing platform.

Figure 4:
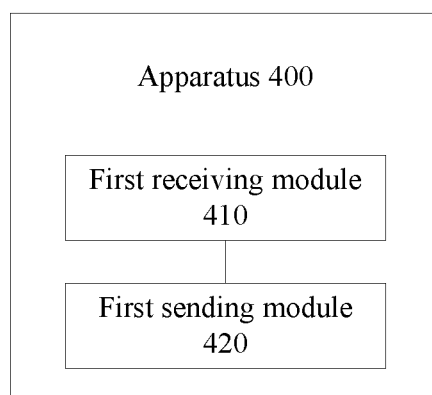
FIG. 4 is a schematic block diagram of an apparatus for trusted measurement of a cloud computing platform according to an embodiment of the present invention.

FIG. 4 is a schematic block diagram of an apparatus for trusted measurement of a cloud computing platform according to an embodiment of the present invention. The apparatus 400 shown in FIG. 4 includes a first receiving module 410 and a first sending module 420.

The first receiving module 410 is configured to receive a current running indicator of software on a cloud computing platform, where the current running indicator of the software is signed by a trusted platform of the cloud computing platform by using a digital certificate issued by a certification authority (CA).

The first sending module 420 is configured to send the current running indicator of the software to a third-party management and audit system, so that the third-party management and audit system generates an audit report based on the current running indicator of the software and a running security indicator of the software, where the audit report indicates trustworthiness of the cloud computing platform.

The trusted third-party management and audit system performs trusted measurement on the cloud computing platform, and compares the running security indicator, obtained through assessment by a security organization, of the software with the original current running indicator that is of the software and that is obtained after trusted measurement is performed on the cloud computing platform, so as to obtain the audit report. In this way, a process of trusted measurement of the cloud computing platform is open and transparent. This avoids a prior-art risk that a current running indicator of software may be tampered with due to certificate replacement in a process for performing trusted measurement on a cloud computing platform by using an internal management and audit system, so that authenticity of trusted measurement of the cloud computing platform is improved, thereby increasing a user's trust in the cloud computing platform.

Figure 5:
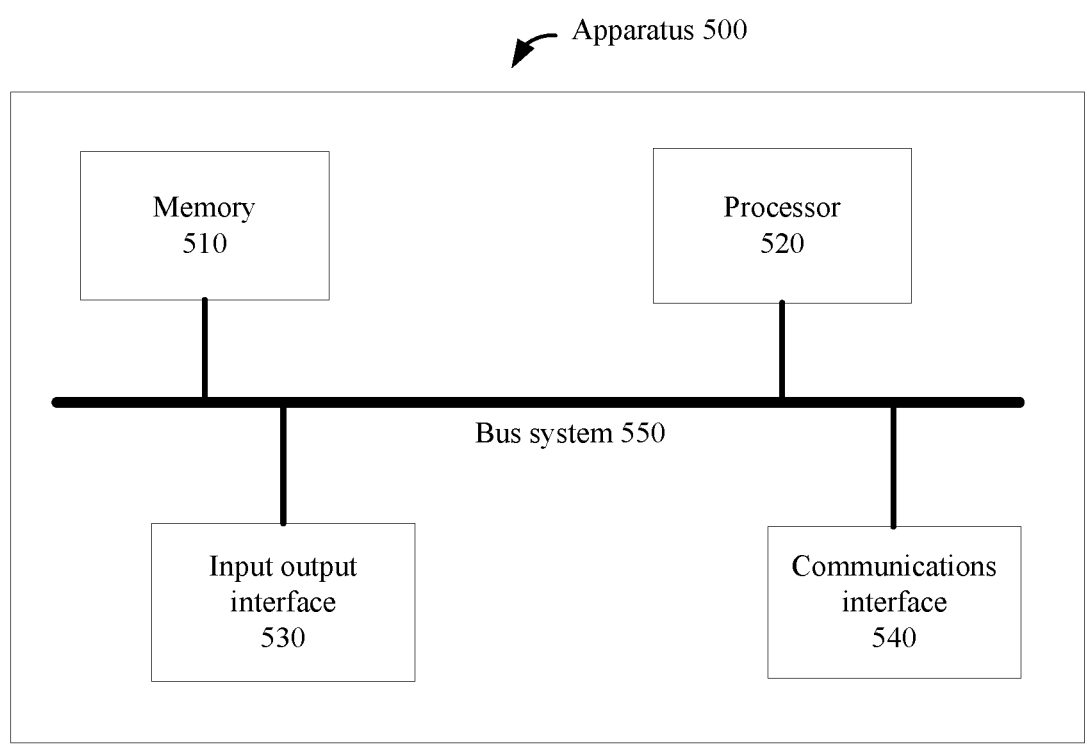
FIG. 5 is a schematic block diagram of an apparatus for trusted measurement of a cloud computing platform according to an embodiment of the present invention.

FIG. 5 is a schematic block diagram of an apparatus for trusted measurement of a cloud computing platform according to an embodiment of the present invention. The apparatus 500 shown in FIG. 5 includes a memory 510, a processor 520, an input/output interface 530, a communications interface 540, and a bus system 550. The memory 510, the processor 520, the input/output interface 530, and the communications interface 540 are connected by using the bus system 550. The memory 510 is configured to store an instruction. The processor 520 is configured to execute the instruction stored in the memory 510, to control the input/output interface 530 to receive input data and information and output data such as an operation result, and control the communications interface 540 to send a signal.

The communications interface 540 is configured to: receive a current running indicator of software on a cloud computing platform, where the current running indicator of the software is signed by a trusted platform of the cloud computing platform by using a digital certificate issued by a certification authority (CA); and obtain a running security indicator of the software from a third-party assessment organization.

The processor 520 is configured to generate an audit report based on the current running indicator of the software and the running security indicator of the software, where the audit report indicates trustworthiness of the cloud computing platform.

It should be understood that, in this embodiment of the present invention, the processor 520 may be a general central processing unit (CPU), a microprocessor, an application-specific integrated circuit (ASIC), or one or more integrated circuits, and is configured to execute a related program to implement the technical solution provided in this embodiment of the present invention.

It should be further understood that the communications interface 540 uses a transceiver apparatus such as, but not limited to, a transceiver, to implement communication between the apparatus 500 and another device or communications network.

The memory 510 may include a read-only memory and a random access memory, and provide the instruction and data for the processor 520. A part of the processor 520 may further include a non-volatile random access memory. For example, the processor 520 may further store device type information.

In addition to a data bus, the bus system 550 may include a power bus, a control bus, a status signal bus, and the like. However, for clear description, various types of buses are marked as the bus system 550 in the figure.

In an implementation process, the steps in the foregoing method may be performed by using an integrated logic circuit of hardware in the processor 520 or an instruction in a form of software. The steps of trusted measurement disclosed with reference to the embodiments of the present invention may be directly performed by a hardware processor, or may be performed by hardware in the processor and a software module. The software module may be located in a mature storage medium in the art, such as a random memory, a flash memory, a read-only memory, a programmable read-only memory or an electrically erasable programmable memory, or a register. The storage medium is located in the memory 510. The processor 520 reads information from the memory 510 and performs the steps of the foregoing method by using the hardware of the processor 520. To avoid repetition, details are not described herein again.

A trusted third-party management and audit system performs trusted measurement on the cloud computing platform, and compares the running security indicator, obtained through assessment by the security organization, of the software with the original current running indicator that is of the software and that is obtained after trusted measurement is performed on the cloud computing platform, so as to obtain the audit report. In this way, a process of trusted measurement of the cloud computing platform is open and transparent. This avoids a prior-art risk that a current running indicator of software may be tampered with due to certificate replacement in a process for performing trusted measurement on a cloud computing platform by using an internal management and audit system, so that authenticity of trusted measurement of the cloud computing platform is improved, thereby increasing a user's trust in the cloud computing platform.

Figure 6:
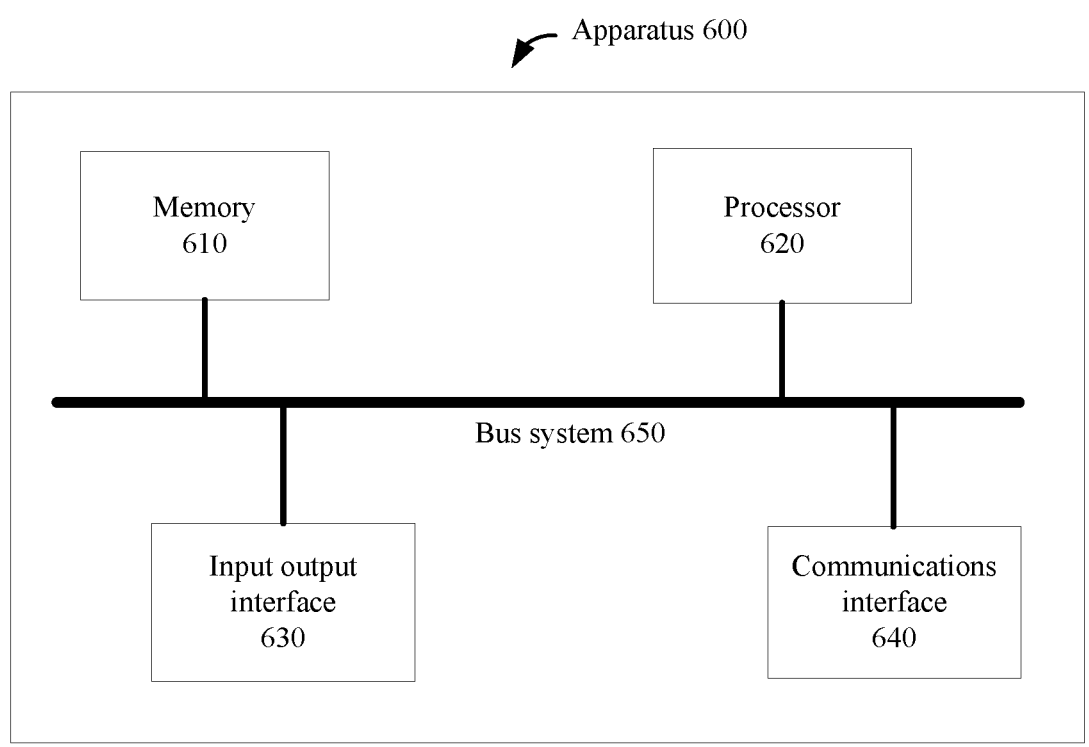
FIG. 6 is a schematic block diagram of an apparatus for trusted measurement of a cloud computing platform according to an embodiment of the present invention.

FIG. 6 is a schematic block diagram of an apparatus for trusted measurement of a cloud computing platform according to an embodiment of the present invention. The apparatus 600 shown in FIG. 6 includes a memory 610, a processor 620, an input/output interface 630, a communications interface 640, and a bus system 650. The memory 610, the processor 620, the input/output interface 630, and the communications interface 640 are connected by using the bus system 650. The memory 610 is configured to store an instruction. The processor 620 is configured to execute the instruction stored in the memory 610, to control the input/output interface 630 to receive input data and information and output data such as an operation result, and control the communications interface 640 to send a signal.

The communications interface 640 is configured to: receive a current running indicator of software on a cloud computing platform, where the current running indicator of the software is signed by a trusted platform of the cloud computing platform by using a digital certificate issued by a certification authority (CA); and send the current running indicator of the software to a third-party management and audit system, so that the third-party management and audit system generates an audit report based on the current running indicator of the software and a running security indicator of the software, where the audit report indicates trustworthiness of the cloud computing platform.

It should be understood that, in this embodiment of the present invention, the processor 620 may be a general central processing unit (CPU), a microprocessor, an application-specific integrated circuit (ASIC), or one or more integrated circuits, and is configured to execute a related program to implement the technical solution provided in this embodiment of the present invention.

It should be further understood that the communications interface 640 uses a transceiver apparatus such as, but not limited to, a transceiver, to implement communication between the apparatus 600 and another device or communications network.

The memory 610 may include a read-only memory and a random access memory, and provide the instruction and data for the processor 620. A part of the processor 620 may further include a non-volatile random access memory. For example, the processor 620 may further store device type information.

In addition to a data bus, the bus system 650 may include a power bus, a control bus, a status signal bus, and the like. However, for clear description, various types of buses are marked as the bus system 650 in the figure.

In an implementation process, the steps in the foregoing method may be performed by using an integrated logic circuit of hardware in the processor 620 or an instruction in a form of software. The steps of the method for trusted measurement disclosed with reference to the embodiments of the present invention may be directly performed by a hardware processor, or may be performed by hardware in the processor and a software module. The software module may be located in a mature storage medium in the art, such as a random memory, a flash memory, a read-only memory, a programmable read-only memory or an electrically erasable programmable memory, or a register. The storage medium is located in the memory 610. The processor 620 reads information from the memory 610 and performs the steps of the foregoing method by using the hardware of the processor 620. To avoid repetition, details are not described herein again.

The trusted third-party management and audit system performs trusted measurement on the cloud computing platform, and compares the running security indicator, obtained through assessment by a security organization, of the software with the original current running indicator that is of the software and that is obtained after trusted measurement is performed on the cloud computing platform, so as to obtain the audit report. In this way, a process of trusted measurement of the cloud computing platform is open and transparent. This avoids a prior-art risk that a current running indicator of software may be tampered with due to certificate replacement in a process for performing trusted measurement on a cloud computing platform by using an internal management and audit system, so that authenticity of trusted measurement of the cloud computing platform is improved, thereby increasing a user's trust in the cloud computing platform.

It should be understood that, in the embodiments of the present invention, "B corresponding to A" indicates that B is associated with A, and B may be determined based on A. However, it should further be understood that determining A based on B does not mean that B is determined based on A only; that is, B may also be determined based on A and/or other information.

It should be understood that the term "and/or" in this specification describes only an association relationship for describing associated objects and represents that three relationships may exist. For example, A and/or B may represent the following three cases: A exists, both A and B exist, and B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing described system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for trusted measurement of a cloud computing platform, comprising:
   receiving, by a third-party management and audit system, a current running indicator of software on a cloud computing platform, wherein the current running indicator of the software is signed by a trusted platform of the cloud computing platform by using a digital certificate issued by a certification authority (CA);
   obtaining, by the third-party management and audit system, a running security indicator of the software from a third-party assessment organization;
   generating, by the third-party management and audit system, an audit report based on the current running indicator, signed by using the digital certificate, of the software and the running security indicator of the software, wherein the audit report indicates trustworthiness of the cloud computing platform;
   receiving, by the third-party management and audit system, information about a running version of the software; and
   obtaining, by the third-party management and audit system, information about an assessment version of the software from the third-party assessment organization.

2. The method according to claim 1, wherein the current running indicator of the software is signed by the cloud computing platform by using the digital certificate issued by the CA.

3. The method according to claim 1, wherein the current running indicator of the software carries an identifier of a virtual machine of the cloud computing platform, and the method further comprises:
   receiving, by the third-party management and audit system, a correspondence between a user and a virtual machine identifier;
   determining, by the third-party management and audit system based on the identifier of the virtual machine and the correspondence, a user corresponding to the identifier of the virtual machine; and
   sending, by the third-party management and audit system, the audit report to the user corresponding to the identifier of the virtual machine.

4. The method according to claim 1, wherein
   generating, by the third-party management and audit system, the audit report based on the current running indicator of the software and the running security indicator of the software comprises:
   generating, by the third-party management and audit system, the audit report based on the current running indicator of the software, the running security indicator of the software, the information about the running version of the software, and the information about the assessment version of the software.

5. The method according to claim 1, wherein the method further comprises:
   receiving, by the third-party management and audit system, a running log of the cloud computing platform sent by the cloud computing platform; and, wherein
   generating, by the third-party management and audit system, the audit report based on the current running indicator of the software and the running security indicator of the software further comprises:
   generating, by the third-party management and audit system, the audit report based on the current running indicator of the software, the running security indicator of the software, and the running log.

6. The method according to claim 1, wherein the method further comprises:
   receiving, by the third-party management and audit system, an operation log of the cloud computing platform sent by the cloud computing platform; and, wherein
   generating, by the third-party management and audit system, an audit report based on the current running indicator of the software and the running security indicator of the software further comprises:
   generating, by the third-party management and audit system, the audit report based on the current running indicator of the software, the running security indicator of the software, and the operation log.

7. The method according to claim 1, wherein before the receiving, by the third-party management and audit system, the current running indicator of software on the cloud computing platform, the method further comprises:
   receiving, by the third-party management and audit system, a registration request sent by the cloud computing platform, wherein the registration request comprises a digital certificate of the cloud computing platform; and sending, by the third-party management and audit system, acknowledgement information to the cloud computing platform, wherein the acknowledgement information indicates that the cloud computing platform is successfully registered with the third-party management and audit system.

8. The method according to claim 1, wherein before receiving, by the third-party management and audit system, the current running indicator of software on the cloud computing platform, the method further comprises:
receiving, by the third-party management and audit system, a registration request sent by the cloud computing platform, wherein the registration request comprises a digital certificate of the trusted platform; and
sending, by the third-party management and audit system, acknowledgement information to the cloud computing platform, wherein the acknowledgement information indicates that the trusted platform is successfully registered with the third-party management and audit system.

9. The method according to claim 1, wherein the method further comprises:
sending, by the third-party management and audit system, the digital certificate to the CA; and
receiving, by the third-party management and audit system, verification information, sent by the CA, of the digital certificate, wherein the verification information indicates whether the digital certificate is valid; and, wherein
generating, by the third-party management and audit system, the audit report based on the current running indicator of the software and the running security indicator of the software comprises:
generating, by the third-party management and audit system, the audit report based on the current running indicator of the software, the running security indicator of the software, and the verification information of the digital certificate.

10. The method according to claim 1, wherein the third-party management and audit system is a system located outside the cloud computing platform, the third-party management and audit system is provided by a trusted third party, the third-party management and audit system is connected to the cloud computing platform, and the third-party management and audit system is connected to the third-party assessment organization.

11. A method for trusted measurement of a cloud computing platform, comprising:
receiving, by a trusted evidence processing system, a current running indicator of software on a cloud computing platform, wherein the current running indicator of the software is signed by a trusted platform of the cloud computing platform by using a digital certificate issued by a certification authority (CA); and
sending, by the trusted evidence processing system, the current running indicator of the software to a third-party management and audit system, so that the third-party management and audit system generates an audit report based on the current running indicator of the software and a running security indicator of the software, wherein the audit report indicates trustworthiness of the cloud computing platform; and, wherein the method further comprises:
receiving, by the trusted evidence processing system, information about a running version of the software on the cloud computing platform; and
sending, by the trusted evidence processing system, the information about the running version of the software to the third-party management and audit system.

12. The method according to claim 11, wherein before the sending, by the trusted evidence processing system, the current running indicator of the software to a third-party management and audit system, the method further comprises:
signing, by the trusted evidence processing system, the current running indicator by using a digital certificate of the cloud computing platform, wherein the digital certificate of the cloud computing platform is the digital certificate issued by the CA.

13. The method according to claim 11, wherein the method further comprises:
sending, by the trusted evidence processing system, a correspondence between a user and a virtual machine to the third-party management and audit system, so that the third-party management and audit system determines a user based on obtained virtual machine identifier information and sends the audit report to the user.

14. The method according to claim 11, wherein the method further comprises:
sending, by the trusted evidence processing system, a digital certificate of the trusted platform and the digital certificate of the cloud computing platform to the CA;
receiving, by the trusted evidence processing system, verification information sent by the CA, wherein the verification information indicates whether the digital certificate of the trusted platform and the digital certificate of the cloud computing platform are valid; and
sending, by the trusted evidence processing system, the verification information to the third-party management and audit system.

15. The method according to claim 11, wherein before the receiving, by a trusted evidence processing system, a current running indicator of software on a cloud computing platform, the method further comprises:
receiving, by the trusted evidence processing system, a registration request sent by the cloud computing platform, wherein the registration request comprises the digital certificate of the trusted platform of the cloud computing platform; and
sending, by the trusted evidence processing system, acknowledgement information to the third-party management and audit system, wherein the acknowledgement information indicates that the trusted platform is successfully registered with the trusted evidence processing system.

16. The method according to claim 11, wherein the third-party management and audit system is a system located outside the cloud computing platform, the third-party management and audit system is provided by a trusted third party, the third-party management and audit system is connected to the cloud computing platform, and the third-party management and audit system is connected to a third-party security assessment organization.

17. An apparatus for trusted measurement of a cloud computing platform, wherein the apparatus comprises a processor configured to execute machine-readable instructions comprising:
a first receiving module, configured to receive a current running indicator of software on a cloud computing platform, wherein the current running indicator of the software is signed by a trusted platform of the cloud computing platform by using a digital certificate issued by a certification authority (CA);

a first obtaining module, configured to obtain a running security indicator of the software from a third-party assessment organization; and a generation module, configured to generate an audit report based on the current running indicator of the software and the running security indicator of the software, wherein the current running indicator of the software is received by the receiving module and signed by using the digital certificate, the running security indicator of the software being obtained by the obtaining module, and the audit report indicates trustworthiness of the cloud computing platform; and, wherein the apparatus further comprises:

a third receiving module, configured to receive information about a running version of the software; and a second obtaining module, configured to obtain information about an assessment version of the software from the third-party assessment organization.

18. The apparatus according to claim 17, wherein the current running indicator of the software is signed by the cloud computing platform by using the digital certificate issued by the CA.

19. The apparatus according to claim 17, wherein the current running indicator of the software carries an identifier of a virtual machine of the cloud computing platform, and the apparatus further comprises:

a second receiving module, configured to receive a correspondence between a user identifier and a virtual machine identifier;

a determining module, configured to determine, based on the identifier of the virtual machine and the correspondence, a user corresponding to the identifier of the virtual machine; and a first sending module, configured to send the audit report to the user corresponding to the identifier of the virtual machine.

20. The apparatus according to claim 17,
wherein
the generation module is further configured to generate the audit report based on the current running indicator of the software, the running security indicator of the software, the information about the running version of the software, and the information about the assessment version of the software.

21. The apparatus according to claim 17, wherein the apparatus further comprises:

a fourth receiving module, configured to receive a running log of the cloud computing platform sent by the cloud computing platform; and the generation module is further configured to generate the audit report based on the current running indicator of the software, the running security indicator of the software, and the running log.

22. The apparatus according to claim 17, wherein the apparatus further comprises:

a fifth receiving module, configured to receive an operation log of the cloud computing platform sent by the cloud computing platform; and the generation module is further configured to generate the audit report based on the current running indicator of the software, the running security indicator of the software, and the operation log.

23. The apparatus according to claim 17, wherein the apparatus further comprises:

a fourth receiving module, configured to receive a registration request sent by the cloud computing platform, wherein the registration request comprises a digital certificate of the cloud computing platform; and a second sending module, configured to send acknowledgement information to the cloud computing platform, wherein the acknowledgement information indicates that the cloud computing platform is successfully registered with a third-party management and audit system.

24. The apparatus according to claim 17, wherein the apparatus further comprises:

a fifth receiving module, configured to receive a registration request sent by the cloud computing platform, wherein the registration request comprises a digital certificate of the trusted platform; and a third sending module, configured to send acknowledgement information to the cloud computing platform, wherein the acknowledgement information indicates that the trusted platform is successfully registered with a third-party management and audit system.

25. The apparatus according to claim 17, wherein the apparatus further comprises:

a fourth sending module, configured to send the digital certificate to the CA; and a sixth receiving module, configured to receive verification information, sent by the CA, of the digital certificate, wherein the verification information indicates whether the digital certificate is valid; and, wherein the generation module is further configured to generate the audit report based on the current running indicator of the software, the running security indicator of the software, and the verification information of the digital certificate.

26. The apparatus according to claim 17, wherein a third-party management and audit system is a system located outside the cloud computing platform, the third-party management and audit system is provided by a trusted third party, the third-party management and audit system is connected to the cloud computing platform, and the third-party management and audit system is connected to the third-party assessment organization.

27. An apparatus for trusted measurement of a cloud computing platform, wherein the apparatus comprises a processor configured to execute machine-readable instructions comprising:

a first receiving module, configured to receive a current running indicator of software on a cloud computing platform, wherein the current running indicator of the software is signed by a trusted platform of the cloud computing platform by using a digital certificate issued by a certification authority (CA); and a first sending module, configured to send the current running indicator of the software to a third-party management and audit system, so that the third-party management and audit system generates an audit report based on the current running indicator of the software and a running security indicator of the software, wherein the audit report indicates trustworthiness of the cloud computing platform; and, wherein the apparatus further comprises:

a second receiving module, configured to receive information about a running version of the software on the cloud computing platform; and a third sending module, configured to send the information about the running version of the software to the third-party management and audit system.

28. The apparatus according to claim 27, wherein the apparatus further comprises:

a processing module, configured to sign the current running indicator by using a digital certificate of the cloud computing platform, wherein the digital certificate of the cloud computing platform is the digital certificate issued by the CA.

29. The apparatus according to claim 27, wherein the apparatus further comprises:
a second sending module, configured to send a correspondence between a user and a virtual machine to the third-party management and audit system, so that the third-party management and audit system determines a user based on obtained virtual machine identifier information and sends the audit report to the user.

30. The apparatus according to claim 27, wherein the apparatus further comprises:
a fourth sending module, configured to send a digital certificate of the trusted platform and the digital certificate of the cloud computing platform to the CA;
a third receiving module, configured to receive verification information sent by the CA, wherein the verification information indicates whether the digital certificate of the trusted platform and the digital certificate of the cloud computing platform are valid; and
a fifth sending module, configured to send the verification information to the third-party management and audit system.

31. The apparatus according to claim 27, wherein the apparatus further comprises:
a fourth receiving module, configured to receive a registration request sent by the cloud computing platform, wherein the registration request comprises the digital certificate of the trusted platform of the cloud computing platform; and
a sixth sending module, configured to send acknowledgement information to the third-party management and audit system, wherein the acknowledgement information indicates that the trusted platform is successfully registered with a feasible evidence processing system.

32. The apparatus according to claim 27, wherein the third-party management and audit system is a system located outside the cloud computing platform, the third-party management and audit system is provided by a trusted third party, the third-party management and audit system is connected to the cloud computing platform, and the third-party management and audit system is connected to a third-party assessment organization.

* * * * *